(12) United States Patent
Christen et al.

(10) Patent No.: US 12,427,587 B2
(45) Date of Patent: Sep. 30, 2025

(54) WOOD DRILL

(71) Applicant: Robert Bosch GmbH, Stuttgart (DE)

(72) Inventors: Stefan Christen, Langendorf (CH); Lorenz Kaeser, Rüttenen (CH)

(73) Assignee: Robert Bosch GmbH, Stuttgart (DE)

( * ) Notice: Subject to any disclaimer, the term of this patent is extended or adjusted under 35 U.S.C. 154(b) by 351 days.

(21) Appl. No.: 17/779,046

(22) PCT Filed: Oct. 14, 2020

(86) PCT No.: PCT/EP2020/078957
§ 371 (c)(1),
(2) Date: May 23, 2022

(87) PCT Pub. No.: WO2021/104741
PCT Pub. Date: Jun. 3, 2021

(65) Prior Publication Data
US 2022/0410284 A1    Dec. 29, 2022

(30) Foreign Application Priority Data

Nov. 27, 2019  (DE) ...................... 10 2019 218 341.7
Nov. 28, 2019  (DE) ...................... 10 2019 218 421.9

(51) Int. Cl.
*B23B 51/00*    (2006.01)
*B27G 15/00*    (2006.01)

(52) U.S. Cl.
CPC .......... *B23B 51/0063* (2013.01); *B27G 15/00* (2013.01)

(58) Field of Classification Search
CPC ........ B27G 15/00; B27G 15/02; B23B 51/009
See application file for complete search history.

(56) References Cited

U.S. PATENT DOCUMENTS

| 1,483,082 A | 2/1924 | Dosimont |
| 2009/0116919 A1 | 5/2009 | Dost et al. |

(Continued)

FOREIGN PATENT DOCUMENTS

| CN | 101856737 A | 10/2010 | |
| CN | 103213179 A | * 7/2013 | ......... B23B 51/0054 |

(Continued)

OTHER PUBLICATIONS

Translation of CN-103213179 (Year: 2013).*
(Continued)

*Primary Examiner* — Bobby Yeonjin Kim
(74) *Attorney, Agent, or Firm* — Maginot, Moore & Beck LLP

(57) ABSTRACT

A wood drill includes a clamping portion for connecting, for conjoint rotation, to a tool fitting of a portable power tool, and a head portion which is provided with a centering geometry. The clamping portion is formed at a first end, remote from a workpiece, and the head portion is formed at a second end, close to a workpiece, of the wood drill. The clamping portion is connected to the head portion via a shank portion. A maximum outside radius of the head portion is greater than a maximum outside radius of the shank portion. The head portion has at least one main lip with at least two stages for introducing a bore with a predefined inside radius into a workpiece. An outside radius of a main lip base is less than 60%, preferably less than 50%, of an outside radius of the head portion.

14 Claims, 5 Drawing Sheets

(56) References Cited

U.S. PATENT DOCUMENTS

| | | | |
|---|---|---|---|
| 2013/0189044 A1 | 7/2013 | Durfee et al. | |
| 2015/0016906 A1* | 1/2015 | York | B27G 15/00 408/1 BD |
| 2020/0316694 A1 | 10/2020 | Miller | |

FOREIGN PATENT DOCUMENTS

| | | | | |
|---|---|---|---|---|
| CN | 204295019 U | | 4/2015 | |
| CN | 106077768 A | | 11/2016 | |
| CN | 207577504 U | | 7/2018 | |
| DE | 299 11 945 U1 | | 11/1999 | |
| DE | 100 07 736 A1 | | 8/2001 | |
| DE | 101 52 295 A1 | | 7/2002 | |
| DE | 102010024391 A1 | * | 12/2011 | ............... B27C 3/08 |
| EP | 2217417 B1 | * | 6/2016 | ............. B27G 15/00 |
| GB | 133 494 A | | 10/1919 | |
| GB | 2 405 820 A | | 3/2005 | |
| JP | 2006-82420 A | | 3/2006 | |
| WO | WO-2020092462 A1 | * | 5/2020 | ............. B27G 15/00 |

OTHER PUBLICATIONS

Translation of DE-102010024391 (Year: 2011).*
International Search Report corresponding to International Patent Application No. PCT/EP2020/078957, mailed Jan. 22, 2021 (7 pages).

* cited by examiner

WOOD DRILL

This application is a 35 U.S.C. § 371 National Stage Application of PCT/EP2020/078957, filed on Oct. 14, 2020, which claims the benefit of priority to (i) Serial No. DE 10 2019 218 341.7, filed on Nov. 27, 2019 in Germany, and (ii) Serial No. DE 10 2019 218 421.9, filed on Nov. 28, 2019 in Germany, the disclosures of which are incorporated herein by reference in their entirety.

BACKGROUND

The present disclosure relates to a wood drill bit, having a clamping portion for connecting in a rotationally fixed manner to a tool receiver of a hand-held power tool, and a head portion provided with a centering geometry, wherein the clamping portion is realized at a first end of the wood drill bit that faces away from the workpiece and the head portion is realized at a second end that faces toward the workpiece, wherein the clamping portion is connected to the head portion via a shank portion, and wherein a maximum outer radius of the head portion is greater than a maximum outer radius of the shank portion.

Wood drill bits are known from the prior art, in a wide range of variations. They can be used to drill holes with high dimensional accuracy into wood or wood-like workpieces. However, in such workpieces there are often metallic objects such as, for example, connection and/or fastening elements in the form of nails, screws or staples. If the wood drill comes into contact with these metallic objects when a hole is being drilled, this results in a high degree of wear on the cutting edges and an associated considerable reduction in service life.

An auger drill bit comprising a reamer is known from EP 2 217 417 B1. This already known drill bit can cut through a large number of metal nails, at least when drilling in wood at slow speed and with high torque, without a significant drop in drilling performance caused by the blunting of the lips.

SUMMARY

The present disclosure relates to a wood drill bit, having a clamping portion for connecting in a rotationally fixed manner to a tool receiver of a hand-held power tool, and a head portion provided with a centering geometry. The clamping portion is realized at a first end of the wood drill bit that faces away from the workpiece and the head portion is realized at a second end that faces toward the workpiece, wherein the clamping portion is connected to the head portion via a shank portion, and wherein a maximum outer radius of the head portion is greater than a maximum outer radius of the shank portion. The head portion has at least one lip that comprises at least two steps. According to one embodiment, the head portion is for drilling a hole of a predefined inner radius into a workpiece, wherein an outer radius of a lip base is less than 60%, preferably less than 50%, of an outer radius of the head portion.

As a result of the at least one lip of the wood drill bit being embodied in a multiply axially set-back, stepped manner, metal bodies present within the workpiece, for example, are cut through piece by piece, resulting in considerably less wear on the lip. The wood drill bit can easily cut through any metal bodies even at high speed and not only in a torque mode of a hand-held power tool at reduced speed and high torque. The dimensioning of the main step also provides a limitation of the necessary drive torque of the wood drill bit when cutting through metallic objects. The wood drill bit is preferably designed for drilling in wood and in other, comparably soft materials, such as plastic, etc. A total axial length of the wood drill bit may preferably be up to 600 mm with a diameter of between preferably 6 mm and 35 mm.

Preferably, the head portion has a helically coiled surface geometry, having at least one chip groove and having at least one minor cutting edge.

Due to the helically coiled surface geometry, the chips produced during drilling are easily discharged. The minor cutting edges provide a substantially smooth inner wall of a hole to be drilled in the workpiece by means of the wood drill bit.

Preferably, the at least two steps of the at least one lip are set back axially by one step height with respect to the radially inner lip base in the direction of the second end of the wood drill bit.

As a result, the lip cuts a metal object piece by piece into metal fragments and thus does not have to remove the metal object completely over its transverse extent with respect to the longitudinal central axis.

In a technically advantageous further development, each of the at least two steps of the lip has a radial step width.

As a result of the step of a lip being in each case radially more outward relative to the at least one step, improved cutting results are obtained in wood that is interspersed with metal bodies such as nails, screws, staples, etc.

According to a favorable design, the radial step width is between 1 mm and 10 mm, preferably between 2 mm and 5 mm.

Due to this exemplary design, improved working results are obtained.

Preferably, each step base of the at least two steps is inclined in each case by a step angle perpendicularly to the longitudinal central axis in the direction of the first end of the wood drill bit.

Improved cutting-through of any metal body present in the workpiece is thus achieved in a simple manner. The walls of the steps are each substantially parallel to the longitudinal central axis of the wood drill bit.

Preferably, the step angle is between 0° and 65°, preferably about 40°.

As a result, improved working results are obtained in a simple and uncomplicated manner in use of the wood drill bit.

According to a further design, between the at least one lip and perpendicular to the longitudinal central axis there is a profile angle that is between 10° and 30°. If the shank portion is provided with a helical geometry instead of a cylindrical conformation, the profile angle should be greater than a pitch of this then helical shank geometry. Particularly preferably, the profile angle is between 15° and 25°.

Improved cutting results can thus be achieved in a safe and reliable manner.

Preferably, a wedge angle of the at least one lip is approximately 60°.

This can enable the provision of a robust and resistant cutting edge, as a result of which the service life of the wood drill bit can preferably be increased.

Preferably, there is a rake angle between the at least one chip groove and the longitudinal central axis. The rake angle is preferably 15°.

This ensures improved, successive cutting-through of any metallic foreign bodies present in a wooden workpiece. Furthermore, chips are safely and reliably conveyed out of the hole to be drilled.

In the case of another favorable design, the centering geometry is realized in the manner of a screw having a helically encircling thread that has a pitch.

This allows the wood drill bit, after having been placed on the workpiece, to be automatically drawn into it, preferably with simultaneous precise centering.

Preferably, the pitch of the thread is between 1 mm and 2.5 mm.

As a result, the wood drill bit, after having been set in place, is easily and rapidly drawn into the workpiece to be drilled, so that precise centering and a dimensionally accurate hole can be achieved.

Preferably, the wood drill bit is made with a high-strength carbon steel. Alternatively, at least the cutting edge may be made with a high-speed steel (HSS) and/or tungsten carbide. The lip is designed in such a manner that production is possible by means of conventional chip-forming methods and/or by known hot or cold forming processes such as forging, bending or punching.

As a result, the wood drill bit has a comparatively long service life.

BRIEF DESCRIPTION OF THE DRAWINGS

In the description that follows, the disclosure is set forth in more detail on the basis of exemplary embodiments represented in the drawings, in which.

DETAILED DESCRIPTION

Figure 1:
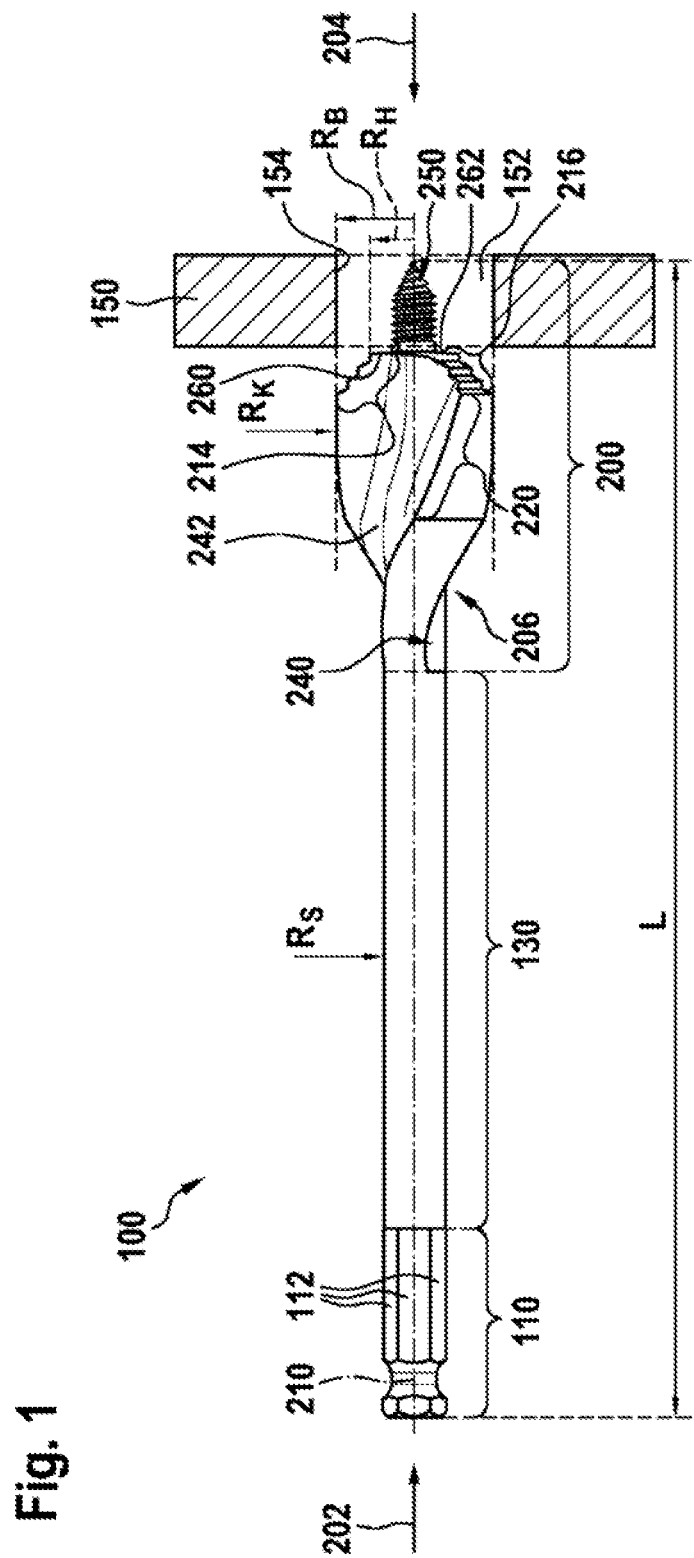
FIG. 1 shows a side view of a wood drill bit.

FIG. 1 shows a wood drill bit 100, which comprises, inter alia, a clamping portion 110 for connecting in a rotationally fixed manner to a tool receiver of a hand-held power tool, not represented, and a head portion 200 having a centering geometry 250. Extending between the clamping portion 110 and the head portion 200 is a shank portion 130, which here is preferably cylindrical. The wood drill bit 100 in this case may be realized as a helical wood drill bit, a worm drill bit and/or augur drill bit.

The clamping portion 110, which merely by way of example here has six tangential flats, is realized at a first end 202, and the head portion 200 with the centering geometry 250 is realized at a second end 204 of the wood drill bit 100 that faces away from the first. It is to be noted that the clamping section 110 may also have more or fewer than six flats. Furthermore, the clamping portion 110 may also be realized as a round shank. Illustratively, the head portion 200 has an approximately helical surface geometry 206 with two chip flutes 240, 242 coiled helically around a longitudinal central axis 210. Here, by way of example, a maximum radius $R_S$ of the shank portion 130 is significantly smaller than a maximum outer radius $R_K$ of the head portion 200 of the wood drill bit 100. Furthermore, an axial total length L of the wood drill bit 100 may be up to 600 mm.

The wood drill bit 100 is preferably rotationally symmetrical with respect to the longitudinal central axis 210.

Here, by way of example, the head portion 200 of the wood drill bit 100 has two lips 214, 216 facing toward a workpiece 150, which are realized diametrically opposite each other with respect to the longitudinal central axis 210.

To enable at least any metal objects present in the workpiece 150, such as nails, screws, staples, clamps or the like, to be cut through more easily and with less wear, here by way of example the first lip 214 of the wood drill bit 100 has three steps—not denoted here, for illustrative clarity—set back axially back from the second end 204. In addition, the first lip 214 of the head portion 200 of the wood drill bit 100 preferably has a first radially inner lip base 260 and, correspondingly, the second lip 216 has a second radially inner lip base 262. Between the two lip bases 260, 262 and the longitudinal central axis 210 there is preferably an angle that is less, but preferably only slightly less, than 90°. In this case, the two lip bases 260, 262 of the head portion 200 are preferably inclined in the direction of the first end 202.

A hole 152, having an approximately cylindrical inner wall 154, here by way of example drilled into the workpiece 150 by means of the wood drill bit 100, has an inner radius $R_B$. Preferably, the inner radius $R_B$ corresponds substantially to the outer radius $R_K$ of the head portion 200 of the wood drill bit 100. An outer radius $R_H$ of both lip bases 260, 262 is preferably in each case less than 60%, preferably less than 50%, of the outer radius of the head portion 200. Furthermore, the head portion 200 preferably has two minor cutting edges, of which only one minor cutting edge 220 is visible and denoted here in the drawing.

Preferably, the wood drill bit 100, at least portionally, comprises high-strength carbon steel, high-speed steel (HSS) and/or carbide metal. According to one embodiment, the wood drill bit 100 is made of carbon steel, in particular high-strength carbon steel. Alternatively, at least the lips 214, 216, or cutting edges thereof, may be made with a high-speed steel (HSS) and/or with tungsten carbide. The lips 214, 216 are preferably designed in such a manner that production is possible by means of conventional chip-forming methods and/or by known hot or cold forming processes such as forging, bending or punching.

Figure 2:
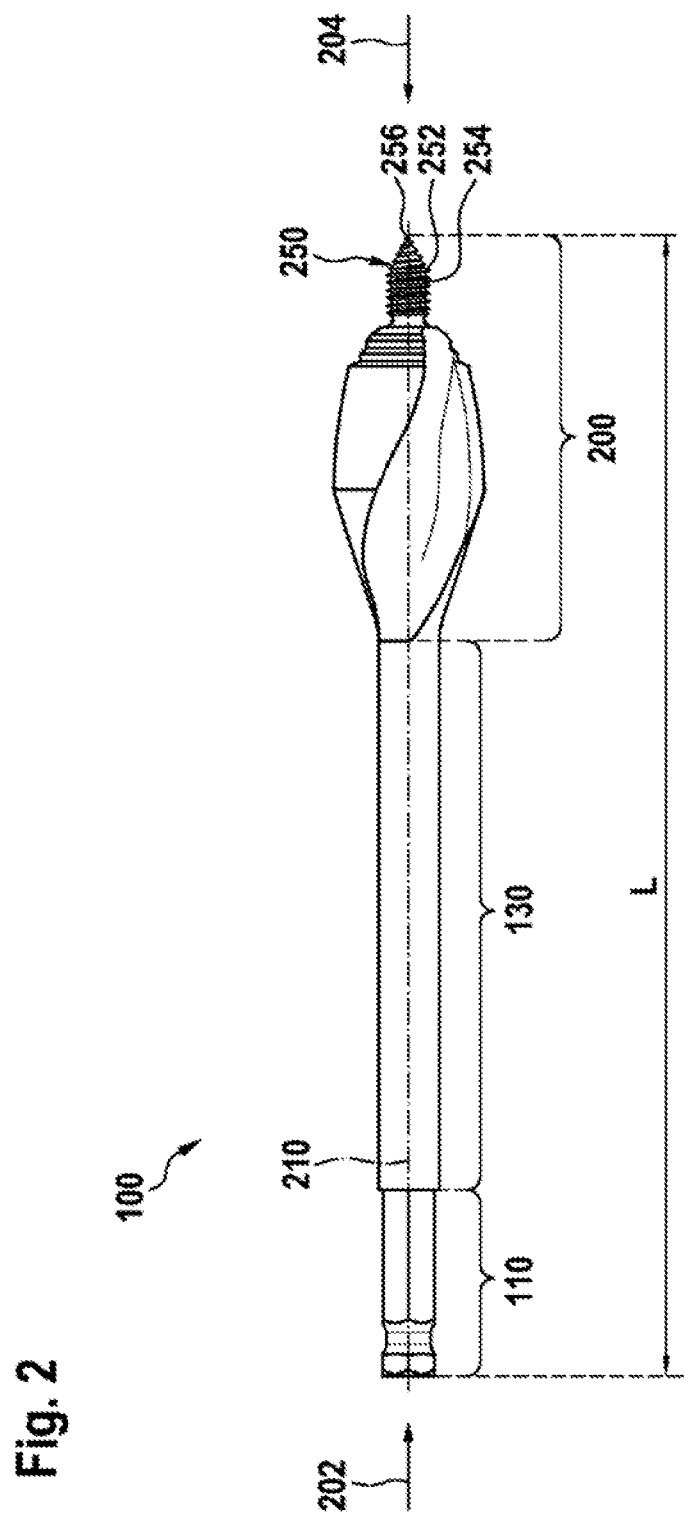
FIG. 2 shows a side view of the wood drill bit from FIG. 1 rotated by 90° about a longitudinal central axis.

FIG. 2 shows the wood drill bit 100 of FIG. 1 with the clamping portion 110, the shank portion 130, and the head portion 200. The head portion 200 preferably has a centering geometry 250 and is rotationally symmetrical with respect to the longitudinal central axis 210. The clamping portion 110 is formed at the first end 202, and the head portion 200, including the centering portion 250, is formed at the second end 204. The exemplarily set-type centering portion 250 preferably has a thread 252 that has a helically encircling thread course 254, as well as a centering tip 256. The wood drill bit 100 illustratively has the total axial length L of up to 600 mm, i.e. with full inclusion of the clamping, shank and head portions 110, 130, 200.

Figure 3:
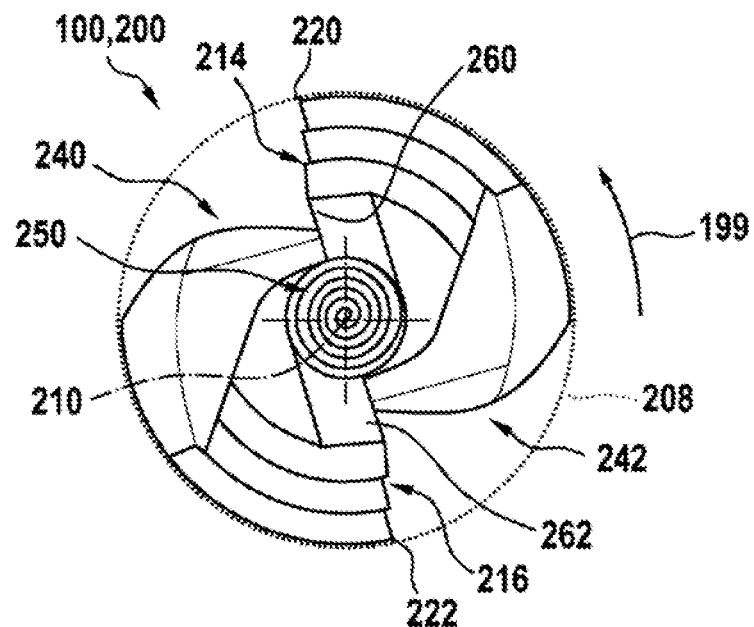
FIG. 3 shows a top view of the wood drill bit from FIG. 2.

FIG. 3 shows the wood drill bit 100 from FIG. 2, the head portion 200 of the wood drill bit 100 having a substantially circular circumferential contour 208. The circumferential contour 208 preferably has a direction of rotation 199 during drilling or cutting operation. The multiply stepped cutting edge 214 with the main lip base 260 and the multiply stepped cutting edge 216 with the main lip base 262 are exemplarily rotationally symmetrical with respect to the centering geometry 250 and the longitudinal central axis 210. The first lip 214 is adjoined by a minor cutting edge 220 extending approximately parallel to the longitudinal central axis 210 in the region of the drawing plane. Accordingly, a minor cutting edge 222 preferably adjoins the second lip

216. Finally, the two helical chip grooves 240, 242 extend circumferentially between the stepped lips 214, 216.

Figure 4:
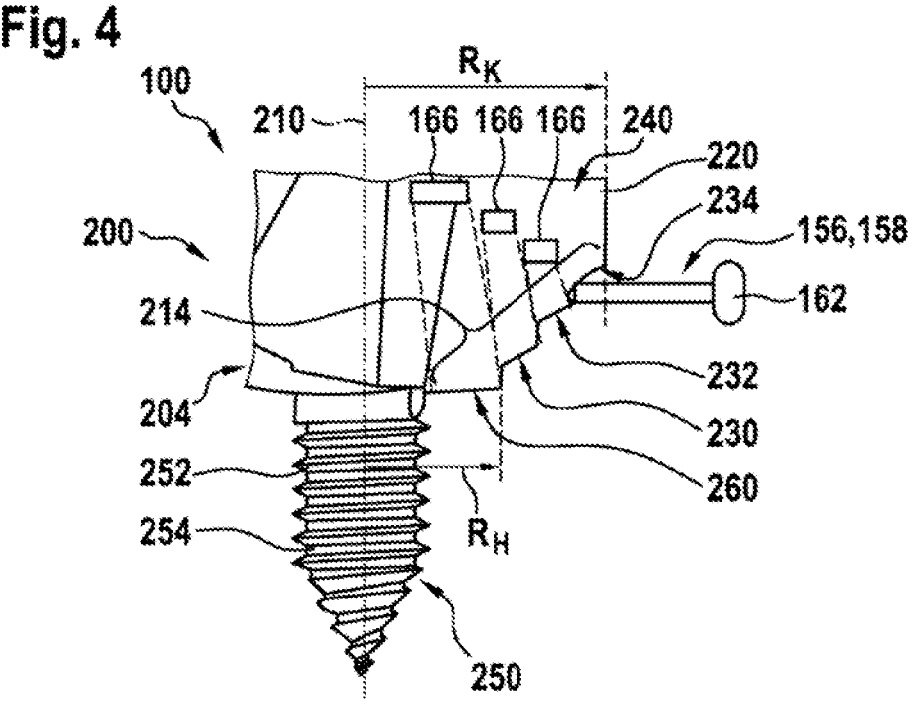
FIG. 4 shows a partial top view of a head portion of the wood drill bit from FIG. 2.

FIG. 4 shows the head portion 200 of the wood drill bit 100 from FIG. 2 and illustrates the centering geometry 250. Preferably, the head portion 200, at the second end 204 of the wood drill bit 100, has the centering geometry 250, formed coaxially with the longitudinal central axis 210, with the thread 252. The thread 252 preferably has the helical thread course 254. The head portion 200 of the wood drill bit 100 has the outer radius $R_K$. Also realized on the head portion 200 are the chip groove 240 and the minor cutting edge 220. The lip 214 has the lip base 260 and at least two, preferably three, steps 230, 232, 234 each set back axially with respect to the second end 204, for cutting through a metal object 156 present in the workpiece, in particular in the form of a connection element 158 and/or fastening element, as required, as drilling progresses. The lip base 260 has an outer radius $R_H$.

According to the disclosure, the metal object 156 that is present in the workpiece, not shown here, and that is represented here, merely by way of example, as a connection element 158 in the form of a nail 162, is successively divided, or disintegrated, into small metal fragments 166 by the action of the multiply stepped lip 214 as drilling progresses. Consequently, the service life of the wood drill bit 100 can be considerably increased compared to previously known solutions.

Figure 5:
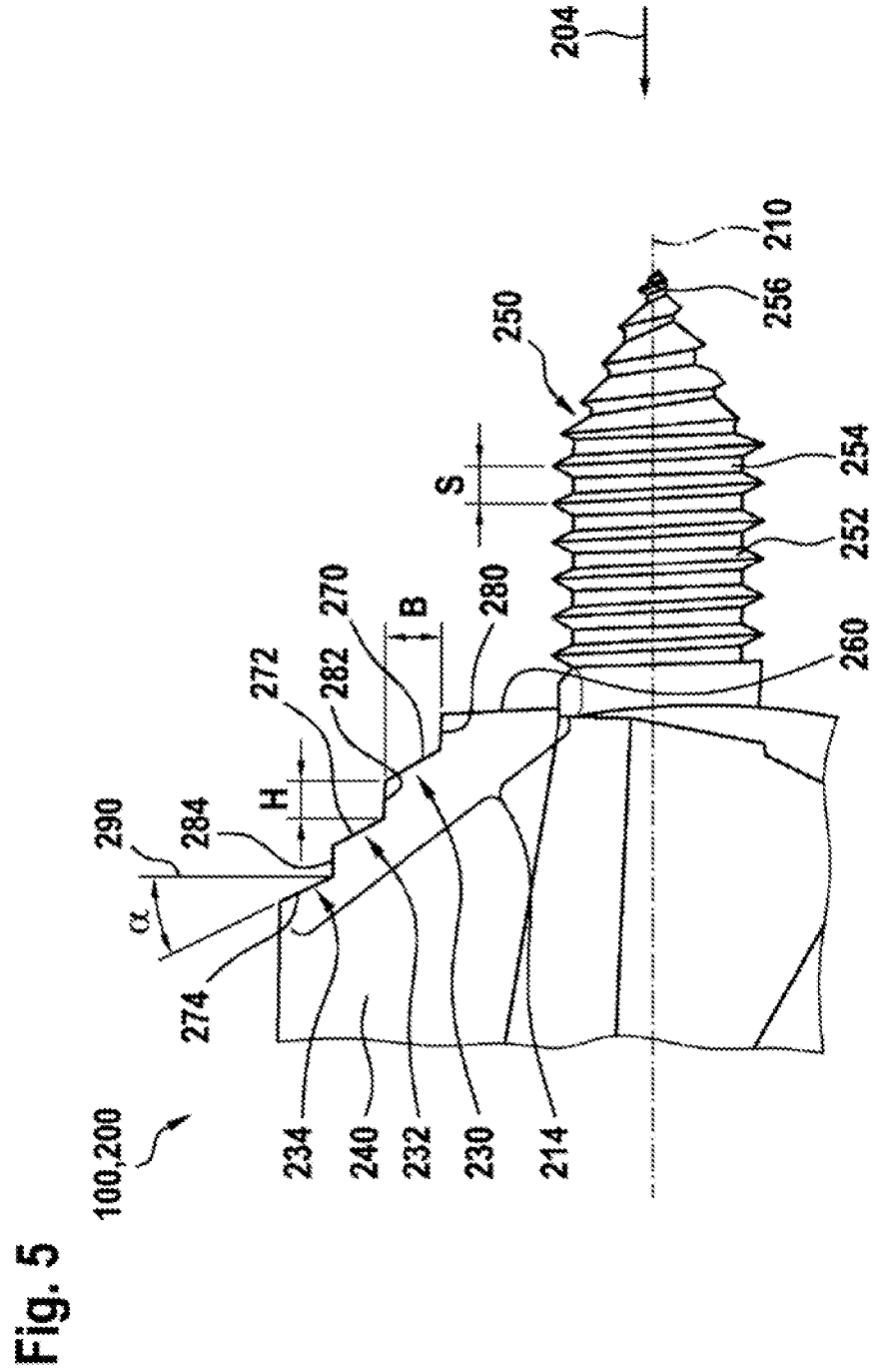
FIG. 5 shows an enlarged partial top view of the head portion from FIG. 4.

FIG. 5 shows the head portion 200 of the wood drill bit 100 from FIG. 4, which at the second end 204 of the wood drill bit 100 has the chip groove 240 and the centering geometry 250 with the thread 252, the thread course 254 and the exemplary mandrel-like centering point 256. A pitch S of the thread course 254 of the thread 252 is preferably between 1 mm and 2.5 mm. The longitudinal central axis 210 of the wood drill bit 100 is coaxial with the centering geometry 250.

The lip 214 preferably has the lip base 260, as well as the three steps 230, 232, 234, each of which, merely by way of example, is radially farther outward and set back farther axially. In this case, the lip 214 is subdivided into at least three portions, or steps 230, 232, 234, which are offset in the axial direction toward the rear, or toward the first axial end 202. The first step 230 preferably has a step base 270 and a step wall 280. Accordingly, the second step 232 preferably has a step base 272 and a step wall 282. The third step 234 has a step base 274 and a step wall 284. The at least two, illustratively three, steps 230, 232, 234 of the lip 214 visible here are each set back axially in the direction of the first end 202 of the wood drill bit 100 by an axial step height H with respect to the radially inner main lip base 260. A radial step width B of the steps 230, 232, 234 is between 1 mm and 10 mm in each case, but preferably between 2 mm and 5 mm in each case.

Illustratively, the step walls 280, 282, 284 are each approximately parallel to the longitudinal central axis 210, while the step bases 270, 272, 274 each run inclined by a step angle α with respect to the longitudinal central axis 210. The angle α in this case is defined between a perpendicular 290 to the longitudinal central axis 210 and the respective step base 270, 272, 274 of the steps 230, 232, 234. The step angle α may be in a range between 0° and 65°, with a step angle α of about 40° is preferred.

Figure 6:
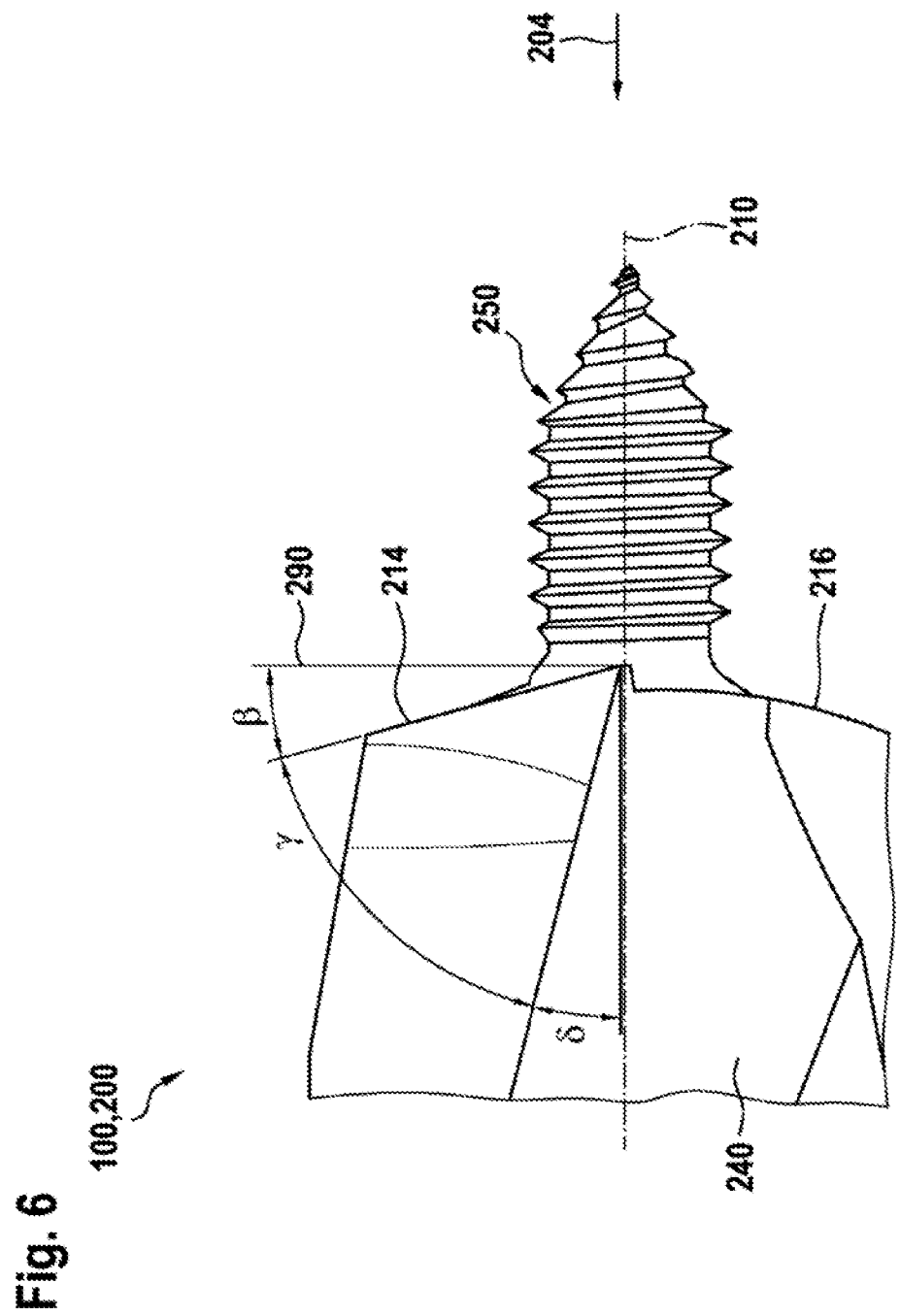
FIG. 6 shows a partial top view of the head portion from FIG. 5 rotated by 90° about the longitudinal central axis.

FIG. 6 shows the head portion 200 of the wood drill bit 100 from FIG. 5 and illustrates the two lips 214, 216 and the centering geometry 250. Between the at least one lip 214, 216 and the perpendicular 290 to the longitudinal central axis 210 there is a profile angle β, which is preferably between 10° and 30°. To achieve improved working results, the profile angle β preferably has a value of between 15° and 25°. Here, merely by way of example, a wedge angle γ of the at least one lip 214, 216 is in the order of magnitude of about 60°. Between the preferably two chip grooves 240, 242 of FIG. 2, of which only one chip groove 240 is visible here, and the longitudinal central axis 210 there is furthermore in each case a rake angle δ, which here merely by way of example is about 15°.

The invention claimed is:

1. A wood drill bit, comprising:
   a clamping portion configured to be connected in a rotationally fixed manner to a tool receiver of a handheld power tool; and
   a head portion provided with a centering geometry,
   wherein the clamping portion is located at a first end of the wood drill bit that faces away from a workpiece and the head portion is located at a second end that faces toward the workpiece,
   wherein the clamping portion is connected to the head portion via a shank portion,
   wherein a maximum outer radius of the head portion is greater than a maximum outer radius of the shank portion,
   wherein the head portion has at least one lip that comprises at least two steps for drilling a hole of a predefined inner radius into the workpiece,
   wherein an outer radius of a lip base of the at least one lip is less than 60% of an outer radius of the head portion,
   wherein a profile angle of between 10° and 30° is defined between the at least one lip and a perpendicular plane to a longitudinal central axis of the drill bit,
   wherein the at least two steps of the at least one lip are axially spaced apart from one another by one step height that is defined as a distance between adjacent steps of the at least two steps,
   wherein each of the at least two steps of the lip has a radial step width, and
   wherein the radial step width is greater than the step height,
   wherein the head portion has a helically coiled surface geometry, and
   wherein the helically coiled surface geometry defines at least one chip groove and at least one minor cutting edge.

2. The wood drill bit as claimed in claim 1, wherein the radial step width is between 1 mm and 10 mm.

3. The wood drill bit as claimed in claim 1, wherein each step base of the at least two steps is inclined in each instance by a step angle defined perpendicularly to the longitudinal central axis in the direction of the first end of the wood drill bit.

4. The wood drill bit as claimed in claim 3, wherein the step angle is between 0° and 65°.

5. The wood drill bit as claimed in claim 1, wherein:
   a wedge angle is defined between the at least one lip and an edge of the at least one chip groove, and
   the wedge angle is approximately 60°.

6. The wood drill bit as claimed in claim 5, wherein:
   a rake angle is defined between the edge of the at least one chip groove and the longitudinal central axis.

7. The wood drill bit as claimed in claim 1, wherein the centering geometry is configured in the manner of a screw having a helically encircling thread that has a pitch.

8. The wood drill bit as claimed in claim 7, wherein the pitch of the thread is between 1 mm and 2.5 mm.

9. The wood drill bit as claimed in claim 1, wherein the wood drill bit is made with a high-strength carbon steel.

10. The wood drill bit as claimed in claim 1, wherein the outer radius of the lip base is less than 50% of the outer radius of the head portion.

11. The wood drill bit as claimed in claim 1, wherein the radial step width is between 2 mm and 5 mm.

12. The wood drill bit as claimed in claim 3, wherein the step angle is about 40°.

13. The wood drill bit as claimed in claim 1, wherein the profile angle is between 15° and 25°.

14. The wood drill bit as claimed in claim 1, wherein at least the at least one lip or cutting edges of the at least one lip are formed with a high-speed steel and/or with tungsten carbide.

\* \* \* \* \*